United States Patent [19]

Goldstein

[11] Patent Number: 4,571,277
[45] Date of Patent: Feb. 18, 1986

[54] COLD RECAPPING METHOD FOR TIRES UTILIZING UNCURED RUBBER AND COMPRESSIBLE MOLD

[75] Inventor: Leon C. Goldstein, Atlanta, Ga.

[73] Assignee: An-Rix, Inc., Atlanta, Ga.

[21] Appl. No.: 411,883

[22] Filed: Aug. 26, 1982

Related U.S. Application Data

[63] Continuation-in-part of Ser. No. 361,403, Mar. 24, 1982, Pat. No. 4,500,375.

[51] Int. Cl.$^4$ ................ B29D 30/54; B29C 33/40
[52] U.S. Cl. .................... 156/96; 156/128.6; 156/130.3; 156/130.7; 156/909; 425/20; 425/39; 425/DIG. 44; 264/36; 264/501; 264/220; 264/227; 264/326
[58] Field of Search .................. 156/95–96, 156/110.1, 128.1, 128.6, 129, 130.3, 130.5, 130.7, 909, 395, 406.4; 425/20, 28 D, 39, 46, DIG. 44; 264/36, 501–502, 220, 225–227, 326, 315

[56] References Cited

U.S. PATENT DOCUMENTS

| | | |
|---|---|---|
| 2,014,010 | 9/1935 | Wheatley . |
| 2,094,511 | 9/1937 | Welch ........................ 18/6 |
| 2,421,099 | 5/1947 | Vogt . |
| 2,966,936 | 1/1961 | Schelkmann . |
| 3,207,647 | 9/1965 | Schelkmann . |
| 3,236,709 | 2/1966 | Carver .................. 156/96 |
| 3,325,326 | 6/1967 | Schelkmann .......... 156/96 |
| 3,752,726 | 8/1973 | Barefoot ............... 156/394 |
| 3,769,121 | 10/1973 | Martin ................... 156/96 |
| 3,779,830 | 12/1973 | Reppel . |
| 3,779,831 | 12/1973 | Reppel . |
| 3,779,832 | 12/1973 | Reppel . |
| 3,779,833 | 12/1973 | Reppel . |
| 3,884,739 | 5/1975 | Hindin et al. .......... 156/96 |
| 3,917,440 | 11/1975 | Huebert ................. 425/18 |
| 3,983,193 | 9/1976 | Wulker et al. ......... 264/36 |
| 3,989,428 | 11/1976 | Cox ....................... 425/18 |
| 4,053,265 | 10/1977 | Wulker et al. ......... 425/20 |
| 4,090,901 | 5/1978 | Baatz ..................... 156/96 |
| 4,115,171 | 9/1978 | Dundon ................. 156/96 |
| 4,185,056 | 1/1980 | Detwiler ................ 264/36 |
| 4,269,644 | 5/1981 | Goldstein .............. 156/96 |
| 4,500,375 | 2/1985 | Goldstein .............. 156/96 |

FOREIGN PATENT DOCUMENTS

| | | |
|---|---|---|
| 1035891 | 8/1958 | Fed. Rep. of Germany . |
| 199580 | 11/1965 | Sweden . |
| 340524 | 1/1968 | Sweden . |
| 371136 | 11/1974 | Sweden . |
| 555680 | 9/1943 | United Kingdom . |
| 555689 | 9/1943 | United Kingdom . |
| 555690 | 9/1943 | United Kingdom . |

*Primary Examiner*—Lois E. Boland
*Attorney, Agent, or Firm*—Kilpatrick & Cody

[57] ABSTRACT

An apparatus and method for cold retreading or recapping of the running surface of a vehicle tire. A rubber, rope and cloth mold larger in diameter than the recap tires produced in it is produced utilizing a new tire male mold covered with perforated polypropylene film, uncured rubber with nylon rope at its edges and highly stretchable cloth enclosed in an envelope and cured by application of pressure and heat. A larger male mold is used to make the final female mold directly, or a likesize male mold is used to make an intermediate mold which is used to produce a tread ring that is stretched to form a larger diameter male mold from which a final mold is prepared. The somewhat flexible, compressible final female mold thus produced is then utilized in recapping tires by positioning it around a prepared tire carcass coated with cement, a layer of uncured rubber, and a sheet of perforated polypropylene film. The mold and tire assembly is then enclosed in an envelope and placed in a chamber where curing of the rubber layer is accomplished by inflation of the tire carcass, evacuation of the envelope, pressurization of the chamber and application of heat.

8 Claims, 9 Drawing Figures

COLD RECAPPING METHOD FOR TIRES UTILIZING UNCURED RUBBER AND COMPRESSIBLE MOLD

This application is a continuation-in-part of my copending application Ser. No. 06/361,403, filed Mar. 24, 1982, now U.S. Pat. No. 4,500,375.

BACKGROUND OF THE INVENTION

The invention relates generally to an improved method for retreading the running surface of a vehicle tire, and more particularly to a novel method for producing a rubber and cloth tread mold and utilizing that tread mold around a buffed tire carcass covered with uncured rubber to accomplish retreading.

Heretofore, various methods have been employed for retreading vehicle tires. Commonly, worn tires are recapped by the warm vulcanization method, wherein an uncured tread cover or "camel-back" is applied to the buffed crown surface of the previously cured tire casing or carcass and the assembly is vulcanized at an elevated temperature in a suitable mold. A major disadvantage of this type of retread is that the fixed mold requires stretching and expansion of the tire during retreading because the tire must be smaller than the mold to insert it in the mold. Steel radial tires do not stretch; thus, mold size is critical, and numerous molds are necessary to accommodate the various steel radial tire dimensions which vary not only from one specified tire size to another but among tires of the same nominal size made by different manufacturers. Any deformation or distortion of the tire casing during the curing operation will tend subsequently to rupture or materially weaken the vulcanized bond between the cured "camel-back" and the crown surface of the tire after it is removed from the vulcanizing mold. In addition, the elevated vulcanizing temperature tends to weaken and deteriorate the previously cured tire casing.

The prior art has sought to overcome shortcomings in the warm vulcanization recapping method by various "cold" recapping methods utilizing both precured rubber treads and uncured rubber. One approach to cold recapping is disclosed in my U.S. Pat. No. 4,269,644, which involves a cold tire recapping method utilizing a precured tread strip and a rubber bonding composition between the strip and the prepared tire carcass.

There are disadvantages associated with utilization of such previously manufactured precured rubber tread material, including the cost of that material as compared to the cost of uncured rubber, the need to maintain a large inventory of widths and tread designs, the difficulty of producing a tire having good physical appearance at the transition of tread and sidewall and the difficulty of retreading traction tires with deep sidewall voids.

A different recapping approach is disclosed in the U.S. Pat. No. 4,185,056 to Detwiler, which discloses the formation of a rubber mold and utilization of that mold together with uncured rubber to retread the prepared tire carcass. The patent to Detwiler discloses formation of the tread mold by utilizing a new mold tire which is coated with a mold release and then covered with a very loosely woven "fabric" network of strands, the transverse strands of which are intended to serve as air venting conduits during the curing operation. Such transverse strands become embedded in the cured female mold and thereafter serve little or no function during recapping utilizing the mold but weaken the tread-forming portion of the rubber mold.

Failure to provide a structure and/or method which effectively purges air and gases at the interface between the tread mold and the new tread mold during recapping causes excessive porosity within the new tread, which creates accelerated wear and tread to tire carcass bonding problems. Furthermore, utilization of transverse strands which become embedded in the mold results in limited mold life because the exposed rubber mold surface does not wear well, and tread groove-forming protrusions in the female retread mold tend to break off during use.

Another prior art approach similar to the Detwiler patent is disclosed in the U.S. Pat. Nos. 3,983,193 and 4,053,265 to Wulker. The Wulker patents disclose a resilient mold which has an unstretched inner diameter smaller than the outer diameter of the cured tread on the recapped tire. In use, the Wulker mold is stretched in order to place it around the tire carcase and uncured rubber assembly and the mold contracts to normal size to impress its pattern on the tread rubber. The Wulker patents disclose provision for purging air and other gases from the mold-tread interface comprising holes passing radially through the mold.

Additional limitations inherent in the prior art rubber molds and methods for recapping with uncured rubber typified by the patents to Detwiler U.S. Pat. No. 4,185,056 and Wulker U.S. Pat. Nos. 3,983,193 and 4,053,265 include problems in fully seating the mold during recapping, difficulties in mounting the mold on a tire carcass and in removing the mold after curing of the recap tread is complete and the need for numerous molds having slightly different diameters in order to accommodate variations among tires being recapped.

Seating problems occur because of sealing contact between the carcass sidewalls and the sidewall-forming portion of the rubber mold which will not easily slide along the carcass sidewall and thereby permit the entire tread-forming portion of the mold to seat in the uncured rubber as the recap tread is formed. A typical prior art approach to this problem involves repeated pressurization and evacuation of the envelope enclosing the carcass and mold during the curing cycle in an effort to "work" the mold into its fully seated position. This practice is inconsistent, however, with the need to maintain constant pressure during the early stage of recap curing in order to achieve optimum curing results.

Problems in mounting the female mold on the uncured rubber and tire carcass and in removal of the female mold from the cured recapped tire reduce production efficiency and removal problems frequently result in damage to the newly recapped tire and/or the mold.

SUMMARY OF THE INVENTION

The tire recapping method and apparatus of the present invention involve use of a new mold tire to prepare a compressible rubber and cloth tread mold of larger diameter than the tire carcasses to be recapped using the tread mold. Where a new male mold tire is available having the desired tread pattern and transverse contour and which is one and one-half to two inches larger in diameter than the original diameter of tires to be recapped, that mold tire may be used to prepare a final female mold directly. If no such larger diameter male mold tire is available, a mold tire of the same diameter as the tires to be recapped may be used to produce a similar mold which will be used as an intermediate mold to prepare a tread ring from which the final mold is made.

In order to prepare the intermediate mold (or final mold if a larger diameter mold tire is available), a layer of uncured rubber is built up on the mold tire tread and then removed. The mold tire tread is then covered with thin perforated polypropylene film, a rectangle of highly stretchable synthetic cloth is positioned on top of the polyethylene film, and the uncured rubber is repositioned around the mold tire on top of the cloth. Two loops of nylon rope are positioned at the circular edges of the uncured rubber somewhat like the beads of a tire. The edges of the cloth are folded up over the ropes and uncured rubber and lapped over the top of the uncured rubber, thereby creating a "sock" entirely surrounding the uncured rubber and ropes and faced on the tread side with polyethylene film. The male mold tire, film, sock, ropes and rubber structure is then enclosed in a curing envelope like the one disclosed in my U.S. Pat. No. 4,269,644, and the uncured rubber is cured by application of heat and pressure in a chamber in accordance with the teaching of my U.S. Pat. No. 4,269,644 for curing the bond between the tire carcass and precured tread.

After removal from the male mold tire, the fabric and rubber female tread mold thus produced may be used to recap tire carcasses as described below if it is a larger-diameter final mold. If it is a like-diameter intermediate mold, it is utilized to produce a tread ring by first covering the buffed crown of a tire carcass of the diameter it is desired to recap with a sheet of thin, perforated polypropylene film and then a layer of uncured rubber slightly thicker than the mold tire tread depth. A sheet of thin, perforated polypropylene film is also placed between the uncured rubber and the intermediate mold, and the mold is placed around the tire on top of the uncured tread rubber previously applied. The assembly is then placed inside a curing envelope like the one disclosed in my U.S. Pat. No. 4,269,644, and cured by application of pressure and heat in a chamber. The pressure resulting when the envelope is evacuated to the atmosphere and the pressure within the curing chamber forces the envelope against the intermediate tread mold, which is in turn forced against and into the uncured rubber. The cloth face of the mold and film allow the sidewall-forming portions of the mold to slide against the corresponding areas of the tire carcass thereby permitting the mold fully to seat against the uncured rubber and tire carcass. The cloth which forms the surface of the tread mold also "wicks" or "bleeds" air and gases out of the tread pattern being formed, and the ropes likewise wick air and gases out of the tread pattern and significantly facilitate passage of such air and gases from the inside to the outside of the intermediate mold around the mold edges.

After curing is completed, the intermediate tread mold is removed from the tread ring and carcass assembly and the tread ring may be removed from the carcass because of the polypropylene film between them.

A final tread mold is then prepared. First, a buffed tire carcass of the nominal diameter it is desired to recap is built up, to increase its diameter, with a layer of cured rubber on the order of twenty thirty-seconds of an inch thick (20/32"). The previously prepared tread ring is stretched and mounted on the built-up tire carcass and cured rubber assembly. The tread ring thus has a gross diameter greater than its original diameter by twice the thickness of the cured rubber layer. The tire carcass, cured rubber and tread ring assembly is then utilized to make a final mold in the same way the intermediate mold was produced. As will be readily appreciated by one skilled in the art, the final mold has substantially the same tread pattern as the original mold tire but will have a diameter greater by approximately twice the thickness of the cured rubber layer interposed between the tire carcass and tread ring.

The final mold may then be utilized to retread a previously prepared tire carcass by first coating the buffed crown of the carcass with cement and then applying a layer of uncured rubber. A sheet of thin, perforated polypropylene film is placed between the uncured rubber and the final mold, and the mold is easily placed around the tire since the mold is larger in diameter than the tire. The assembly is cured inside a curing envelope, under pressure, in accordance with the teaching of my U.S. Pat. No. 4,269,644. Application of pressure causes the final mold to be compressed against the uncured rubber, and the compressibility of the final mold in combination with its relatively large diameter (as compared to a given nominal tire size) permits use of a single tread mold to recap tire carcasses having relatively wide variations from their nominal tire size diameter. Curing at relatively low temperatures (less than 212° F.) permits the recap tread rubber to conform to the final tread mold and fully form a tread design before it stops flowing as a result of curing, and such low temperatures do not damage the tire casing or carcass or turn moisture in the carcass to steam which would expand and damage the casing by causing separations within it. Curing in accordance with the present invention can, however, be accomplished at temperatures up to approximately 260° F. Curing of the recap tread at a relatively low temperature for a relatively long time under uniform pressure in accordance with the present invention also results, for a given type of rubber, in a higher Shore hardness in the recap rubber and, consequently, in a longer-wearing tread.

Utilization of the highly stretchable cloth as a mold surface, ropes at the mold edges, plastic film and preparation of a relatively large diameter, compressible final mold in accordance with the present invention thus achieves several advantages, particularly including the following:

1. Trapped air and all gases evolved during tread curing are vented from the molds, thereby avoiding problems which arise when such gases are not fully vented, including incomplete tread curing and excess tread porosity, which creates wear and bonding problems.

2. Treads formed utilizing the final mold of the present invention form properly and cure fully.

3. The cloth face of the mold substantially extends mold life because the cloth face wears better than a rubber surface.

4. It is substantially easier to release the mold of the present invention from treads formed in it than from a mold having a rubber face and/or a smaller relative diameter or a mold that has vent holes in it in order to release gases.

5. Unlike loose strings or a loosely woven fabric network of strands utilized as a venting material, the cloth utilized in accordance with the present invention does not fragment or fall out of the mold during use.

6. Extension of the cloth entirely around the mold eliminates the need for utilization of a canvas liner when producing the molds or utilizing the final mold to recap tires because, like a liner, the cloth "bleeds" or "wicks" air and gases in the vicinity of the envelope valve. The cloth and mold edge ropes also wick out air and gases from the entire mold inside and outside surfaces during curing of the mold, and the cloth prevents clogging and imprinting of the envelope valve in the outside surface of the mold during both mold formation and recapping.

7. Side forming portions of the mold slide in contact with the tire carcass permitting the mold fully to seat on the carcass and uncured rubber during recapping.

8. Longer wearing recap treads are produced using a given type of rubber when curing is accomplished in accordance with the present invention.

Accordingly, an object of the present invention is to provide an improved flexible, compressible mold which produces superior recap treads, can accomodate a relative wide range of tire sizes and has a long service life.

A further object of the present invention is the provision of a economical system for producing custom molds to provide the capability of recapping tire carcasses with any desired tread design or configuration.

An additional object of the present invention is to provide a highly functional, inexpensive system for producing an improved flexible, compressible mold and utilizing it to retread tires in a "cold" recapping procedure which produces superior recapped tires.

DETAILED DESCRIPTION OF THE DRAWINGS

Figure 1:
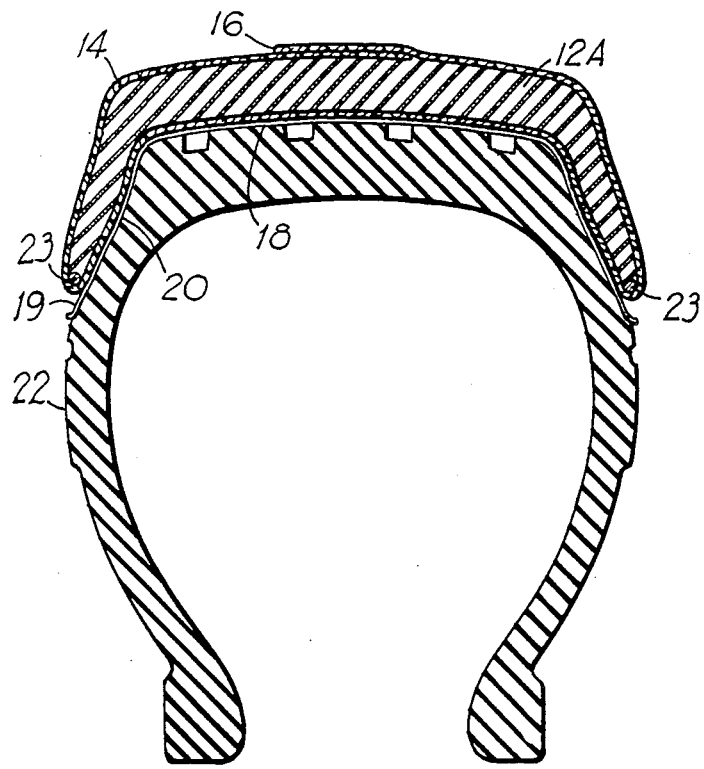
FIG. 1 is a cross-section of a male mold, shown as a tire of appropriate size and having a desired tread pattern covered with a sheet of plastic film, with the mold forming layer of uncured rubber shown surrounded by a layer of wicking cloth, the edges of which lap on the outside thereof.

FIG. 1 illustrates the relationship of elements required for production of the female intermediate mold of the present invention, which may be utilized as a final mold if it is approximately one and one-half to two inches (3.25 to 5 cm.) larger in diameter than the original diameter of tires to be recapped. A layer of uncured rubber 12A enclosed in a sock 14 of highly stretchable synthetic cloth 16 is positioned on the tread 18 and selected sidewall portions 20 of male mold 22 and separated from male mold 22 by a suitable mold release which may be a thin sheet of perforated plastic film 19, such as polypropylene film. Male mold 22 is typically a new tire having the desired tread 18 pattern and transverse contour desired for the recapped tread to be produced. Male mold 22 should be approximately one and one-half to two inches (3.25 to 5 cm.) larger in diameter than the original diameter of tires to be recapped if a final female mold is to produced directly; if male mold 22 is the same diameter as such tires, an intermediate mold and tread ring must first be prepared as further described below. Male mold 22 is preferably a radial rather than bias-ply tire because radial tires are stiffer and thus better withstand molding pressure without deforming such that the tread pattern is distorted. A specific type of cloth 16 which has been shown to achieve the unexpected results of the present invention is a stretchable material known in the tire recapping industry as "wicking material," which is apparently produced by knitting polyester thread around parallel strands of elastic rubber.

The assembly shown in FIG. 1 is prepared by building up a layer of uncured rubber 12A on the tread area 18 of male mold 22. Layer 12A is then temporarily removed from male mold 22. A thin sheet of perforated polypropylene film or other appropriate mold release film 19 is positioned on male mold 22, and ropes 23, which may be three-eighths inch diameter braided nylon cord with ends butted to form a loop of the required diameter, are positioned at the edges of layer 12A. Then, the layer of uncured rubber 12A and ropes 23 are wrapped with a strip of cloth 16 at least twice as wide as layer 12A. Cloth 16 is positioned on the inside surface of layer 12A, or cloth 16 is positioned on the tread 18 of male mold 22 and layer 12A and ropes 23 are positioned on cloth 16, and the edges of cloth 16 are folded over the outer surface of layer 12A such that those edges overlap at any convenient location on the outside of layer 12A. When assembly is complete, the rubber 12A, ropes 23 and cloth 16 structure which will become the female mold are positioned around male mold 22 as shown in FIG. 1.

Figure 2:
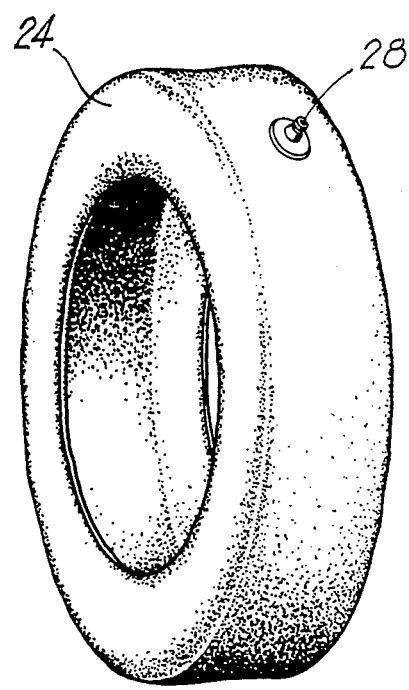
FIG. 2 is a perspective view of one of the envelopes utilized to enclose mold components and male mold tires during intermediate or final mold production, or final tread molds and tire carcasses during retreading, in accordance with the present invention.

Male mold 22, uncured rubber 12A, ropes 23, sock 14 and film 19 positioned as shown in FIG. 1 may then be enclosed in an envelope 24 as shown in FIG. 2. One or more such assemblies are then placed in a curing chamber as disclosed in my U.S. Pat. No. 4,269,644, which is incorporated in its entirety herein by reference, and curing of the uncured rubber layer 12A, and all other curing steps described herein, may be accomplished in accordance with the teaching of that patent for curing the rubber bonding composition between the precured tread strip and prepared tire carcass disclosed therein. Alternatively, each curing step described herein may be accomplished by other appropriate procedures which apply pressure and heat as required. The advantage of avoiding conversion of any moisture present into steam is achieved by curing at temperatures lower than 212° F., but curing of rubber layer 12A may be accomplished at temperatures up to approximately 260° F. with appropriate adjustment of the length of the curing time.

Figure 3:
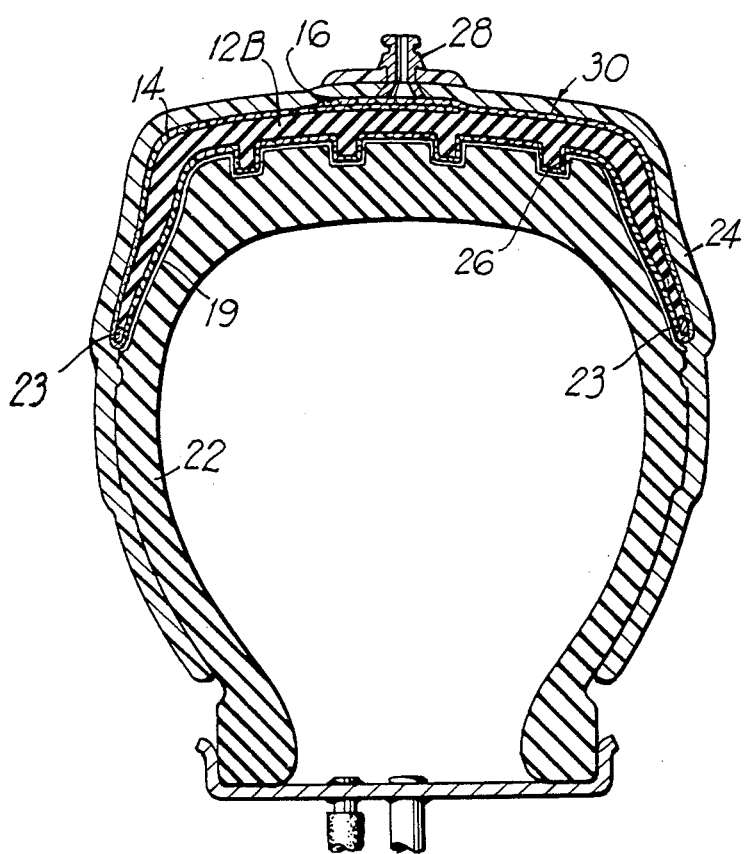
FIG. 3 is a cross-section like FIG. 1 showing a tread mold mounted and being cured within the envelope shown in FIG. 2.

Referring now to FIG. 3, application of pressure during curing forces the cloth 16 and layer of uncured rubber 12A (shown in FIG. 1) down into the grooves 26 of male mold 22, and a cured layer of rubber 12B forms which conforms to the shape of male mold 22 and has a surface formed by the sock 14 and film 19. The highly stretchable cloth 16 utilized for sock 14 is forced down into the grooves 26 by layer 12B and readily adapts to all contours of male mold 22. Because the cloth of sock 14 is a highly effective wicking material permitting passage of gases and air out of the area of interface between male mold 22 and sock 14, and because sock 14 conforms to the convolutions of male mold 22, sock 14 is highly effective in permitting venting of such gases and air. Additionally, the layer or layers of cloth 16 forming sock 14 on the outside of rubber layer 12B serve to facilitate passage of air and gases into a valve 28 in envelope 24 and to prevent imprinting and clogging of valve 28 in rubber layer 12B by pressure on the outside of envelope 24. Such imprinting and clogging would result in an undesirable depression in the female mold 30 being formed and would typically obstruct valve 28, thereby preventing passage of gases and air through it during mold 30 production and when mold 30 is utilized in recapping or in producing a tread ring as described below.

Figure 4:
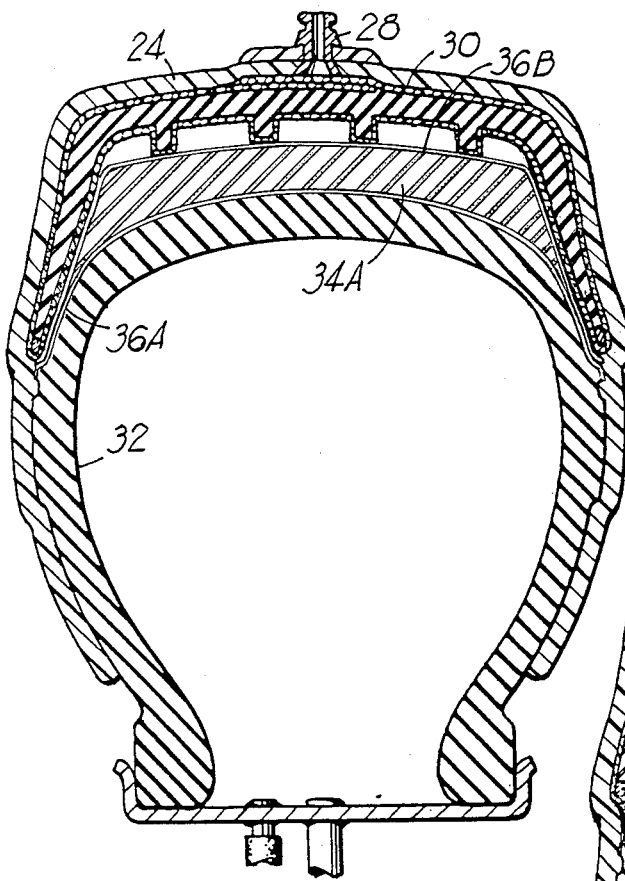
FIG. 4 is a cross-section of the intermediate tread mold of the present invention positioned on plastic film on a layer of uncured rubber in turn positioned on a second layer of plastic film on a tire carcass and enclosed in an envelope prior to evacuation of the envelope and application of pressure to form the tread ring of the present invention.

FIG. 4 illustrates the relationship of elements assembled for producing a tread ring. A layer of uncured rubber 34A which will become the tread ring is built up on a buffed tire carcass 32 of the same nominal diameter as tires it is desired to recap with a mold release such as sheet of thin, perforated plastic film 36A, such as polypropylene film, interposed between the uncured rubber layer 34A and the tire carcass 32. A second mold release sheet of thin, plastic film 36B is placed on top of layer 34A and mold 30 before positioning mold 30 around the tire carcass 32 on top of the film 36A and rubber layer 34A. The mold 30, carcass 32, rubber layer 34A and films 36A and 36B assembly is then placed inside a curing envelope 24. The assembly is placed in a chamber as disclosed in my U.S. Pat. No. 4,269,644, and rubber layer 34A is cured.

Figure 5:
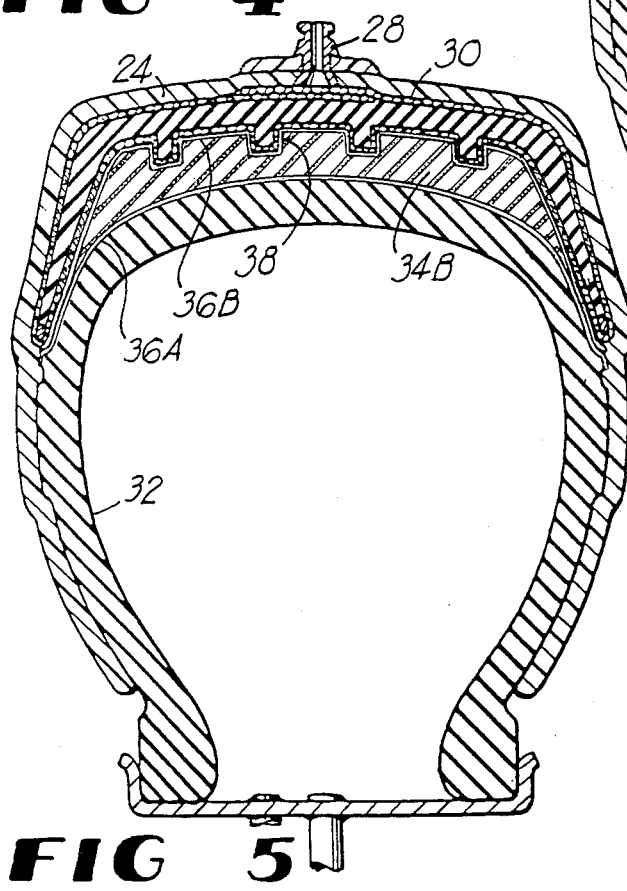
FIG. 5 is a cross-section of the components shown in FIG. 4 after evacuation and pressurization have occurred during curing of the tread ring.

Application of pressure during curing and evacuation of the envelope 24 forces mold 30 against layer 34A causing it to conform to pattern in the face of mold 30, as is illustrated in FIG. 5, thereby forming a cured rubber tread ring 34B having the desired tread pattern 38 therein. Tread ring 34B may be removed from tire carcass 32 after removal of mold 30.

Figure 6:
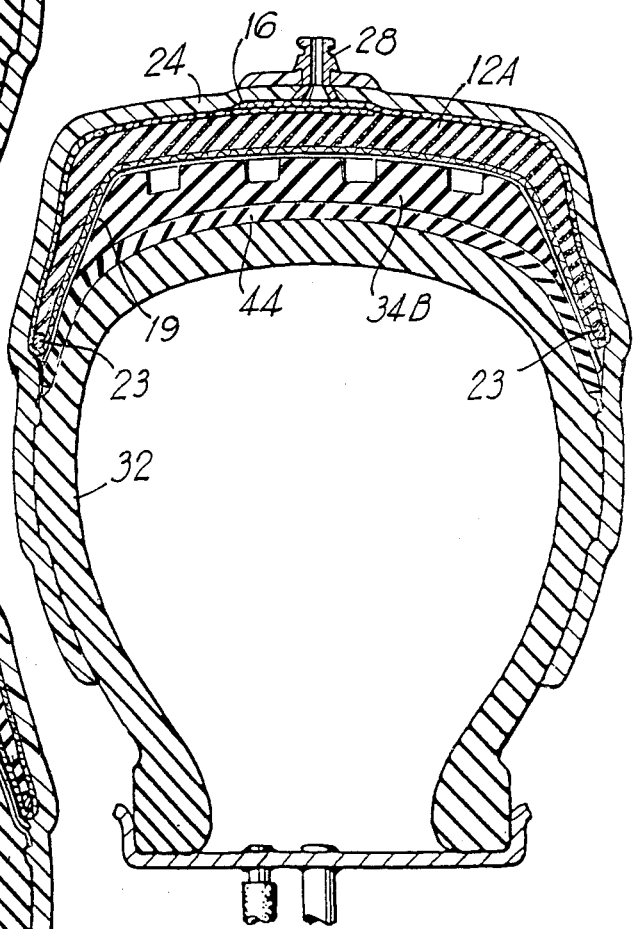
FIG. 6 is a cross-section of a final mold forming layer of uncured rubber shown surrounded by a layer of wicking cloth and positioned on a sheet of plastic film on the tread ring positioned in turn on a spacing layer on a tire carcass, with the assembly enclosed in the envelope shown in FIG. 2.

A final mold having a diameter larger than the tires to be recapped may then be prepared by first positioning elements as illustrated in FIG. 6. A spacing layer 44 of cured rubber or any other suitable material one-half as thick as the increase in diameter desired is positioned on the tread receiving area of tire carcass 32, and tread ring 34B is positioned on layer 44. Mold release such as a thin, perforated sheet of polypropylene or other appropriate film 19 is positioned on tread ring 34B. A layer of uncured rubber 12A, ropes 23, and wicking cloth 16 is then assembled around tread ring 34B, spacing layer 44 and carcass 32, and the assembly is enclosed in an envelope 24 in accordance with the description of FIGS. 1 and 3 hereinabove. Curing is then accomplished by application of pressure and heat in accordance with my U.S. Pat. No. 4,269,644 or any other appropriate curing procedure.

Figure 7:
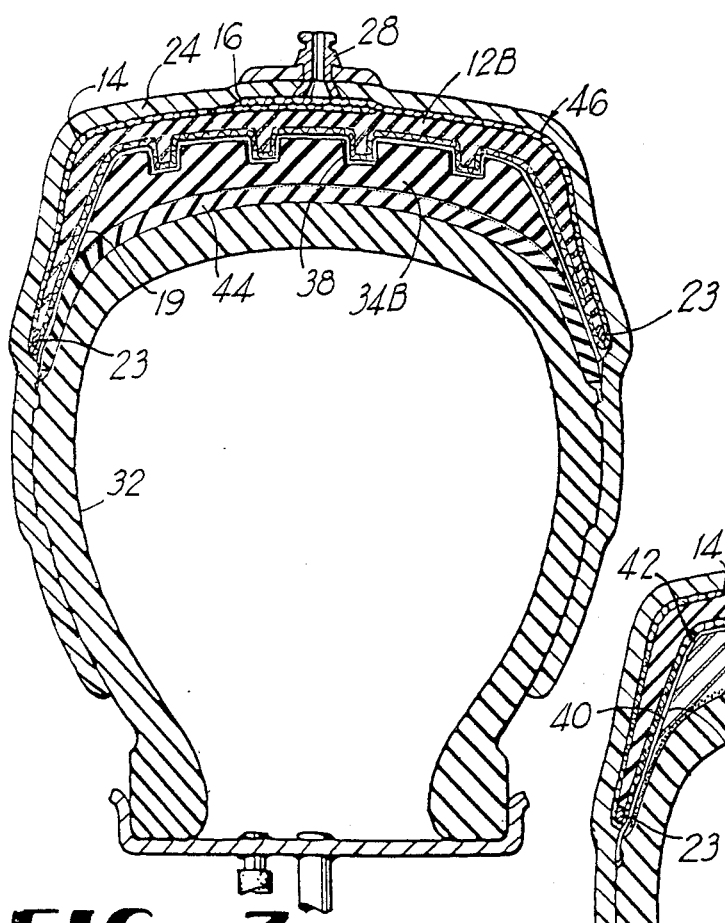
FIG. 7 is a cross-section of the components shown in FIG. 6 after evacuation and presurization have occured during curing of the final mold rubber.

Referring now to FIG. 7, application of pressure during curing forces the cloth 16 in uncured rubber layer 12A (shown in FIG. 6) down into the grooves of tread pattern 38 of tread ring 34B, and a cured layer of rubber 12B forms which conforms to the shape of tread ring 34B and has a surface formed by sock 14 and film 19, thereby forming a final tread mold 46.

Figure 8:
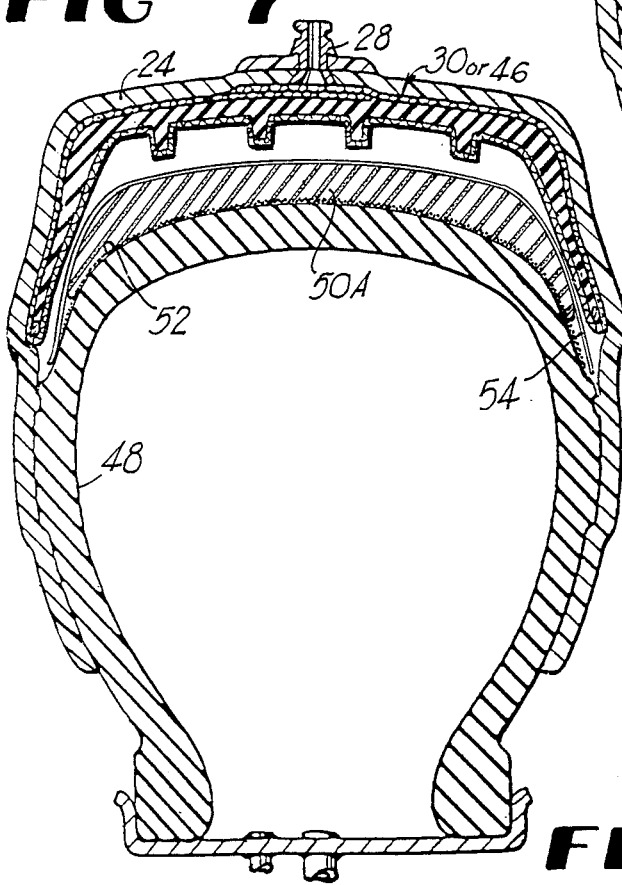
FIG. 8 is a cross-section of the final tread mold of the present invention positioned on plastic film on a layer of uncured rubber on a tire carcass and enclosed in an envelope prior to evacuation of the envelope and application of pressure during curing to recap the carcass.

FIG. 8 illustrates the relationship of elements assembled for recapping a prepared tire carcass 48 in accordance with the present invention. A layer of uncured rubber 50A which will become the recapped tire 48 tread surface is built up on the prepared tire carcass 48 after coating the buffed crown of carcass 48 with cement 52. Mold release such as a sheet of thin, perforated plastic film 54, which may be polypropylene film, is placed between a layer 50A and mold 30 (produced from a larger diameter male mold 22) or 46 (produced using a tread ring 34B) before positioning mold 30 or 46 around the tire carcass 48 on top of rubber layer 50A. The mold 30 or 46, carcass 48, rubber layer 50A and film 54 assembly is then placed inside a curing envelope 24. Two or more such assemblies are then placed in side by side relationship as disclosed in my U.S. Pat. No. 4,269,644, and rubber layer 50A is cured by application of heat and pressure in accordance with the teaching of that patent or any other appropriate curing procedure. As noted above, the advantage of avoiding conversion of moisture to steam is achieved by curing at temperatures lower than 212° F., but curing of rubber layer 34A may be accomplished at temperatures up to approximately 260° F. with appropriate adjustment of the length of the curing time.

Figure 9:
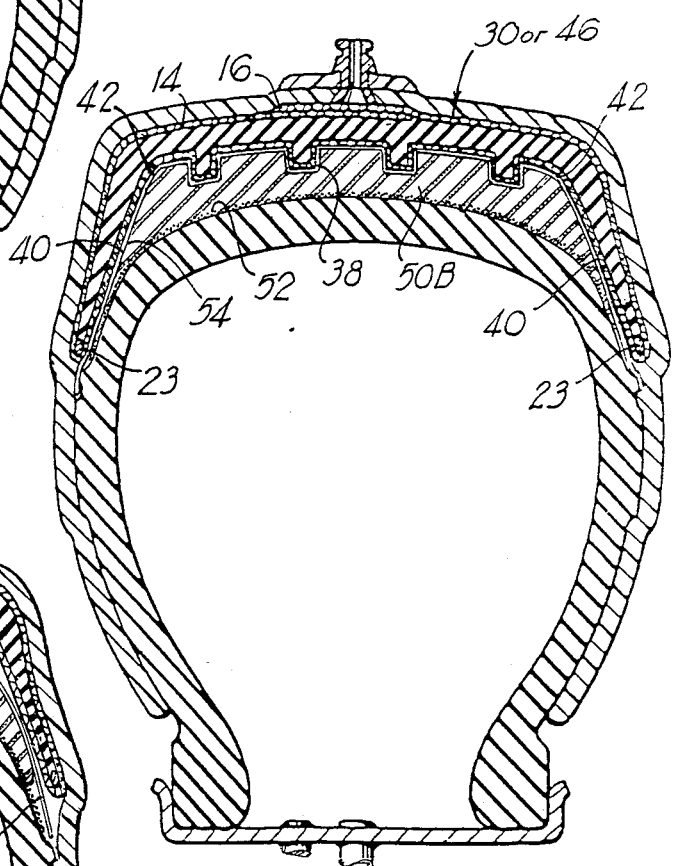
FIG. 9 is a cross-section of the components shown in FIG. 8 after evacuation and pressurization have occurred during curing of the recap tread.

Application of pressure during curing and evacuation of envelope 24 compresses and forces mold 30 or 46 against layer 50A causing it to conform to the pattern in the face of mold 30 or 46, as is illustrated in FIG. 9, thereby forming a cured rubber layer 50B having the desired tread pattern 38 therein. The relatively low friction surfaces presented by cloth 16 face of female mold 30 or 46 and plastic film 54 permit relatively free sliding contact between mold 30 or 46 and rubber layer 50B in sidewall areas 40, thereby permitting mold 30 or 46 fully to seat on layer 50B, including the "corners" 42 of mold 30 or 46 which frequently do not seat fully in prior art molds.

The cloth 16 face of mold 30 or 46 and film 54 and larger diameter of the mold 30 or 46 than the recapped tire carcass 48 and tread rubber 50B also permit easy removal of mold 30 or 46 from tire 48 after completion of the curing cycle. Film 54 typically molds into and adheres to the finished surface of tread 38, imparting a shiny appearance thereto; accordingly, no film 54 removal step is required after completion of the curing cycle.

Although the present invention is described and illustrated with detailed reference to the preferred embodiment, the invention is not intended to be limited to the details of such embodiment, but includes numerous modifications and changes thereto while still falling within the intent and spirit hereof.

I claim:

1. A cold tire recapping method utilizing uncured rubber and a prepared tire carcass comprising the steps of:
   (a) selecting a male mold that has the desired design and transverse contour and diameter wanted for the recapped tread and selected sidewall portions of the tire when recapped and making an intermediate female mold therefrom,
   (b) making a tread ring in the intermediate female mold,
   (c) stretching the tread ring to greater than its normal diameter and making a final female mold thereon, and
   (d) applying a layer of uncured rubber to the running surface of the prepared tire carcass and molding, curing and bonding the layer to the carcass in the final mold.

2. A cold tire recapping method utilizing uncured rubber and a prepared tire carcass comprising the steps of:
   (a) selecting a male mold that has the transverse contour wanted for the recapped tread and selected sidewall portions of the tire when recapped and has the desired design and dimensions including a diameter nominally equal that of the recapped tire,
   (b) applying a first mold release to the male mold tread and selected sidewall portions,
   (c) forming a first layer of uncured rubber of the approximate circumference and width of the male mold tread,
   (d) positioning a pair of first ropes, each adjacent one edge of the first layer of uncured rubber,
   (e) positioning a first rectangle of stretchable cloth between the first layer and first ropes and the mold release-treated male mold tread and folding the first cloth longer opposing edges over the top of the layer and overlapping such edges,
   (f) molding the first layer and cloth against the male mold with heat and pressure for a period sufficient to mold and to cure the rubber and secure the cloth to the surface thereof while simultaneously permitting air trapped between the first layer and the male mold and gases evolved from the first layer during curing to escape through the rope and cloth,
   (g) removing the cured first layer, ropes and cloth as somewhat flexible intermediate female molds with a cloth surface,
   (h) applying a second mold release to the tread receiving and adjacent sidewall portion of a ring-forming tire carcass of the same nominal diameter as the male mold,
   (i) placing a second layer of uncured rubber on the ring-forming tire carcass,
   (j) placing a third mold release on the second layer,
   (k) placing the intermediate female mold around the ring-forming tire carcass,
   (l) molding the second layer between the ring-forming tire carcass and intermediate female mold with heat and pressure for a period sufficient to mold and cure the second layer while permitting air trapped between the second layer and the intermediate female mold and gases evolved from the second layer during curing to escape through the first cloth,
   (m) removing the second layer from the ring-forming carcass as a tread ring,
   (n) placing a spacing layer on the ring-forming tire carcass and stretching and positioning the tread ring on the spacing layer,
   (o) applying a fourth mold release to the outer surface of the tread ring,
   (p) forming a third layer of uncured rubber of the same approximate circumference and width as the tread ring,
   (q) positioning a pair of second ropes, each adjacent one edge of the third layer of uncured rubber,
   (r) positioning a second rectangle of stretchable cloth between the third layer and second ropes and mold release-treated tread ring and folding the cloth opposing edges over the top of the third layer and overlapping such edges,
   (s) molding the third layer and cloth against the tread ring with heat and pressure for a period sufficient to mold and to cure the third layer and secure the cloth to the surface thereof while simultaneously permitting air trapped between the third layer and the male mold and gases evolved from the third layer during curing to escape through the cloth,
   (t) removing the cured third layer and cloth as a somewhat flexible, compressible final female mold with a cloth surface,
   (u) coating the buffed surface of the prepared tire carcass with cement,
   (v) placing a fourth layer of uncured rubber on the buffed surface of the prepared tire carcass,
   (w) applying a fifth mold release between the fourth layer and final female mold and placing the final female mold around the buffed tire carcass, and
   (x) molding the fourth layer against the tire carcass and bonding it thereto with heat and pressure for a period sufficient to mold and cure the fourth layer and the cement while permitting air trapped between the fourth layer and the final female mold and gases evolved from the fourth layer during curing to escape through the second rope and second cloth of the final female mold.

3. A cold tire recapping method according to claim 2 wherein each of said first, second, third, fourth and fifth mold releases comprises plastic film.

4. A cold recapping method according to claim 2 wherein said male mold is a tire having a carcass and each of said molding steps (f), (l) and (x) comprises the steps of:
   (1) placing the tire carcass and elements mounted thereon in a flexible envelope,
   (2) inflating the tire carcass to a low pressure to assume the tire's normal shape within the envelope,
   (3) assembling a group of such tires, carcasses and envelopes with their axes of rotation substantially aligned so that sidewalls of adjacent tires within the group sealingly press contiguous walls of envelopes thereon toward each other,
   (4) applying a controlled axial pressure against the ends of the assembled group to establish a sealed relationship between adjacent tire carcass sidewalls and envelopes within the group,
   (5) holding the assembled groups so the tire carcasses will not move to break this sealed relationship of adjacent tire sidewalls and envelopes within the group,
   (6) placing the tire carcasses while held in the group within a heating chamber.

(7) venting the space between the envelope and tire carcass of each tire in the group to atmospheric pressure, (8) inflating each tire carcass to a relatively high air pressure while continuing to hold the tire carcasses and envelopes in sealed relation to the group and while maintaining a substantially constant axial pressure on the tire carcasses to avoid excess outward expansion at the center of the tread area of each tire carcass, (9) pressurizing the chamber to a pressure somewhat lower than the pressure within each tire carcass, and

(10) heating the interior of the chamber to cure the uncured rubber layer.

5. A cold tire recapping method utilizing uncured rubber and a prepared tire carcass comprising the steps of:

(a) selecting a male mold that has the desired transverse tread and sidewall contour and design and a diameter larger than the tire when recapped, (b) applying a first mold release to the male mold tread and selected sidewall portions, (c) forming a first layer of uncured rubber of the approximate circumference and width of the male mold tread, (d) positioning a pair of ropes, each adjacent one edge of the first layer of uncured rubber, (e) positioning a rectangle of stretch cloth between the first layer and ropes and the mold release-treated male mold tread and folding the cloth longer opposing edges over the tope of the layer and overlapping such edges, (f) molding the first layer and cloth against the male mold with heat and pressure for a period sufficient to mold and to cure the rubber and secure the cloth to the surface thereof while simultaneously permitting air trapped between the layer and the male mold and gases evolved from the layer during curing to escape through the ropes and cloth, (g) removing the cured first layer, ropes and cloth as a somewhat flexible, compressible female mold with a cloth surface, (h) coating the buffed surface of the prepared tire carcass with cement, (i) placing a second layer of uncured rubber on the buffed surface of the prepared tire carcass, (j) applying a second mold release between the second layer and final female mold and placing the female mold around the buffed tire carcass, and (k) molding the second layer against the tire carcass and bonding it thereto with heat and pressure for a period sufficient to mold and cure the second layer and the cement while permitting air trapped between the second layer during curing to escape through the rope and cloth.

6. A cold tire recapping method according to claim 5 wherein each of said first and second mold releases comprises plastic film.

7. A cold tire recapping method according to claim 5 wherein said male mold is a tire having a carcass and each of said molding steps (f) and (h) comprises the steps of:

(1) placing the tire carcass and elements mounted thereon in a flexible envelope, (2) inflating the tire carcass to a low pressure to assume the tire's normal shape within the envelope, (3) assembling a group of such tires, carcasses and envelopes with their axes of rotation substantially aligned so that sidewalls of adjacent tires within the group sealingly press contiguous walls of envelopes thereon toward each other, (4) applying a controlled axial pressure against the ends of the assembled group to establish a sealed relationship between adjacent tire carcass sidewalls and envelopes within the group, (5) holding the assembled groups so the tire carcasses will not move to break this sealed relationship of adjacent tire sidewalls and envelopes within the group, (6) placing the tire carcasses while held in the group within a heating chamber, (7) venting the space between the envelope and tire carcass of each tire in the group to atmospheric pressure, (8) inflating each tire carcass to a relatively high air pressure while continuing to hold the tire carcasses and envelopes in sealed relation to the group and while maintaining a substantially constant axial pressure on the tire carcasses to avoid excess outward expansion at the center of the tread area of each tire carcass, (9) pressurizing the chamber to a pressure somewhat lower than the pressure within each tire carcass, and

(10) heating the interior of the chamber to cure the uncured rubber layer.

8. A cold tire recapping method utilizing uncured rubber and a prepared tire carcass comprising the steps of:

(a) selecting a male mold that has the desired transverse tread and sidewall contour and design and a diameter larger than the tire when recapped, (b) forming a first layer of uncured rubber of the approximate circumference and width of the male mold tread, (c) wrapping the male mold tread and selected sidewall portions with perforated plastic film, (d) positioning a rope at each edge of the first layer of uncured rubber, (e) positioning a rectangle of stretchable cloth between the first layer and rope and the film-covered male mold tread and folding the cloth longer opposing edges over the top of the layer and overlapping such edges, (f) molding the first layer and cloth against the male mold with heat and pressure for a period sufficient to mold and to cure the rubber and secure the cloth to the surface thereof while simultaneously permitting air trapped between the layer and the male mold and gases evolved from the layer during curing to escape through the cloth, (g) removing the cured layer and cloth as a somewhat flexible, compressible female mold with a cloth surface partially faced with plastic film, (h) coating the buffed surface of the prepared tire carcass with cement, (i) placing on the buffed surface of the prepared tire carcass a second layer of uncured rubber having cross-sectional dimensions appropriate for forming the tread and selected sidewall portion of the recapped tread, (j) placing the female mold around the buffed tire carcass, and (k) molding the second layer against the tire carcass and bonding it thereto with heat and pressure for a period sufficient to mold and cure the second layer and cement while permitting air trapped between the second layer and the female mold and gases evolved from the layer during curing to escape through the rope and cloth.

* * * * *